United States Patent [19]

Abe

[11] Patent Number: 5,179,760
[45] Date of Patent: Jan. 19, 1993

[54] APPARATUS FOR CHANGING WIPING RANGE OF WIPER

[75] Inventor: Jun Abe, Ashikaga, Japan

[73] Assignee: Mitsuba Electric Manufacturing Co., Ltd., Gunma, Japan

[21] Appl. No.: 631,423

[22] Filed: Dec. 21, 1990

[30] Foreign Application Priority Data

Dec. 29, 1989 [JP] Japan ................... 1-342592

[51] Int. Cl.$^5$ .............................................. B60S 1/06
[52] U.S. Cl. .................................. 15/250.13; 74/42; 74/70; 74/600; 15/250.16
[58] Field of Search ........... 15/250.13, 250.21, 250.16, 15/250.30, 250.39; 74/40, 42, 51, 70, 75, 600

[56] References Cited

U.S. PATENT DOCUMENTS

| | | | |
|---|---|---|---|
| 2,910,556 | 10/1959 | Kuykendall | 74/42 |
| 4,088,035 | 5/1978 | Bodem | 74/70 |
| 4,597,129 | 7/1986 | Eustache et al. | 15/250.16 |
| 4,765,018 | 8/1988 | Buchanan, Jr. | 15/250.13 |
| 4,787,114 | 11/1988 | Okudaira | 15/250.16 |
| 4,878,398 | 11/1989 | Heinrich | 15/250.13 |
| 4,924,726 | 5/1990 | Rogakos et al. | 74/600 |
| 4,947,507 | 8/1990 | Naiki | 15/250.16 |
| 5,031,265 | 7/1991 | Nakatsukasa et al. | 74/40 |

FOREIGN PATENT DOCUMENTS

| | | | |
|---|---|---|---|
| 1561319 | 2/1969 | France | 15/250.13 |
| 59-47560 | 3/1984 | Japan . | |
| 521698 | 5/1940 | United Kingdom | 15/250.16 |

Primary Examiner—Philip R. Coe
Assistant Examiner—Gary K. Graham
Attorney, Agent, or Firm—Oliff & Berridge

[57] ABSTRACT

An apparatus for changing the wiping range of a wiper enables the wiping range to be changed easily but without involving the risk of unwanted changes. The motor caused movement of the drive link is converted into a movement of the drive link for causing a reciprocating oscillation of wiper arms by first and second links which are each swingably supported, the second link being swingable relative to the first link in such a manner that the stop position of the wiper arms can be varied. An auxiliary link provided on the first link is swingable while following the relative swinging of the second link and being integrated therewith, with the swinging radius of the auxiliary link being smaller than the relative swinging radius of the second link. A spring is supported by two relatively displaceable points of support that are on a link arm of the auxiliary link and on the second link whereby the spring exerts resilient force under which the second link swings to the appropriate one of a plurality of second link positions.

16 Claims, 5 Drawing Sheets

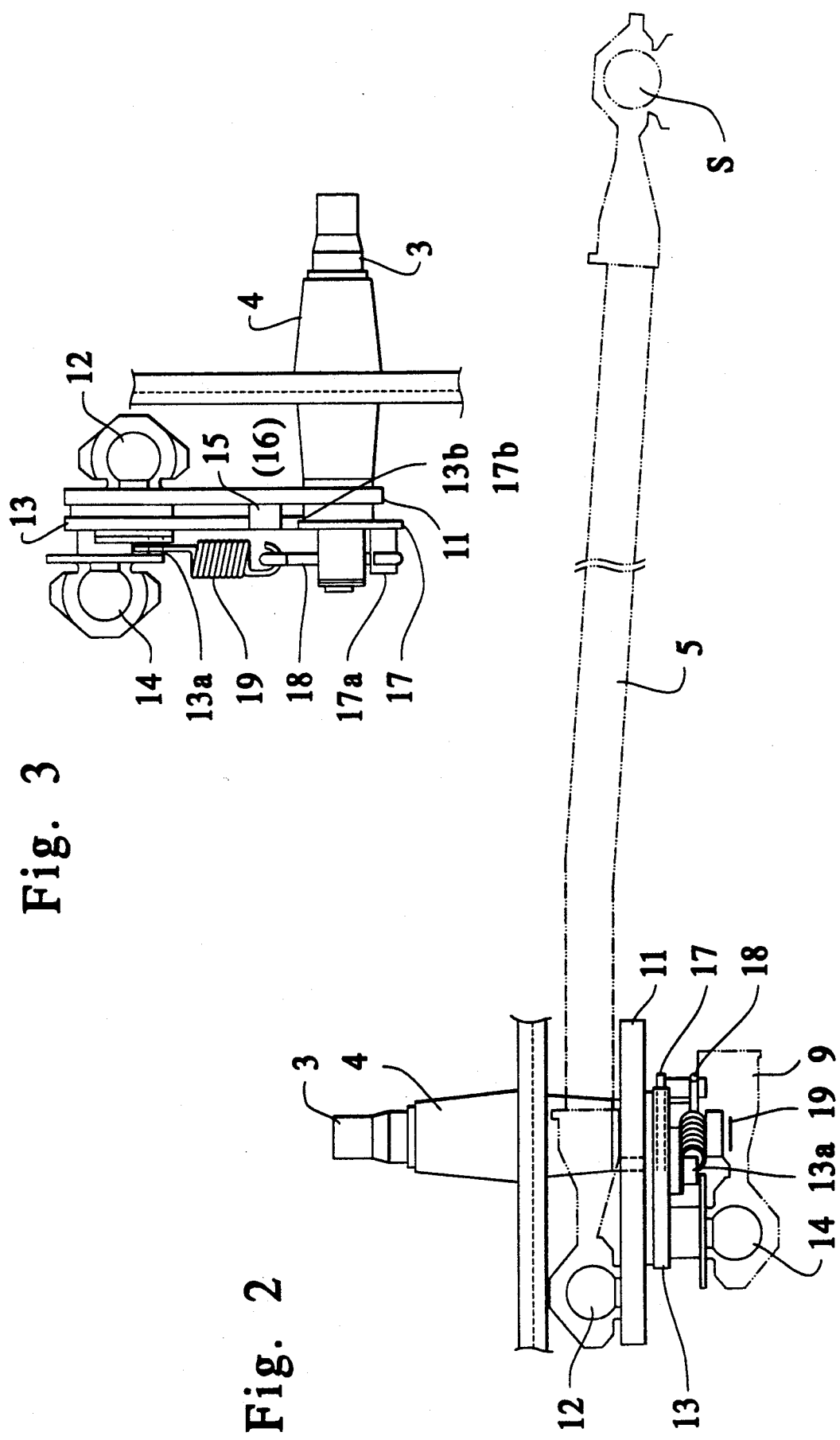

Prior Art

5,179,760

APPARATUS FOR CHANGING WIPING RANGE OF WIPER

BACKGROUND OF THE INVENTION

1. Field of the Invention

The present invention relates to an apparatus for changing the wiping range of a wiper for wiping a window of a vehicle such as an automobile.

2. Description of the Related Art

In a wiper of the above-described type, it is generally desirable that the wiper blades be stopped, when not in use, at a position as low as possible so that the wiper blades do not obstruct the view. The stop position, however, cannot be too low because an extremely low stop position involves the following disadvantage. In winter, when snow deposits on the portion of the vehicle where the stop position is located, the snow may hinder the movement of the wiper blades moving toward the stop position, thereby causing the wiper to be subjected to unnecessarily heavy load. This can lead to breakage of various members of the device, such as the wiper blades, the wiper arms, wiper link rods and the wiper motor.

In order to meet the requirements, a structure has been proposed, for instance, in Japanese Patent Laid-Open No. 59-47560, in which the wiping range within which the wiper arm oscillates can be changed by varying that end of the range including the stop position (without causing any substantial variation in the other end of the range which includes the reversal position). In this structure, in order to change the wiping range, a second link is capable of swinging displacement relative to a first link. However, in order to prevent any unwanted swinging displacement, the second link must be held in position by screws. This means that an operation of changing the wiping range requires the use of tools, the opening of the bonnet, etc, and it is therefore troublesome and complicated. Thus, the proposed structure fails to provide easy operation.

In view of this drawback, it is advantageous to cause the swinging displacement of the second link by utilizing the force of a spring extended between relatively displaceable points of support, one of which is a movable point of support on the swingable member. However, in order to prevent any undesired change in the wiping range, the spring must have strong resilient force. This means that the mechanism for supporting the spring must be correspondingly reinforced. Because this requirement is inconsistent with making the device light and compact, the use of a spring cannot easily be adopted.

SUMMARY OF THE INVENTION

The present invention, which has been accomplished in view of the above-described circumstances, is directed to providing an apparatus for changing the wiping range of a wiper, but still is capable of meeting the contradictory requirements discussed above.

According to the present invention, there is provided an apparatus for changing a wiping range of a wiper having a link movement conversion mechanism for converting a movement of a drive link being driven by a motor, into a movement of the drive link for oscillating of wiper arms, the mechanism comprising rotatably supported first and second links, the second link swinging in tandem with the first link to a plurality of second link positions, a stop position of the wiper arms being varied according to one of the plurality of second link positions. The apparatus comprises: an auxiliary link provided on the first link swingingly in tandem and structurally integrated with the second link having a swinging auxiliary radius smaller than a swinging second link radius; and a spring interposed between and supported by a point on the auxiliary link and a point on the second link said spring exerting a resilient force for swinging said second link to one of the plurality of second link positions.

In the wiping range changing apparatus for a wiper, the spring is preferably a tension spring.

Preferably, the auxiliary link is swingably supported by the fulcrum shaft about which the first link swings.

Preferably, the point of support of the spring that is on the second link comprises the fulcrum shaft about which the second link swings relative to the first link.

By virtue of the above-specified arrangement, the apparatus according to the present invention enables the wiping range of a wiper to be easily changed by utilizing the resilient force of a spring interposed between two relatively displaceable points of support, while also enabling the prevention of unwanted changes in the wiping range without requiring the use of a spring having a strong resilient force.

BRIEF DESCRIPTION OF THE DRAWINGS

The drawings illustrate a wiping range changing apparatus for a wiper according to one embodiment of the present invention, in which

FIG. 2 is a top view of a wiping range changing apparatus;

FIG. 3 is a bottom view of the apparatus;

DESCRIPTION OF THE PREFERRED EMBODIMENT

Figure 1:
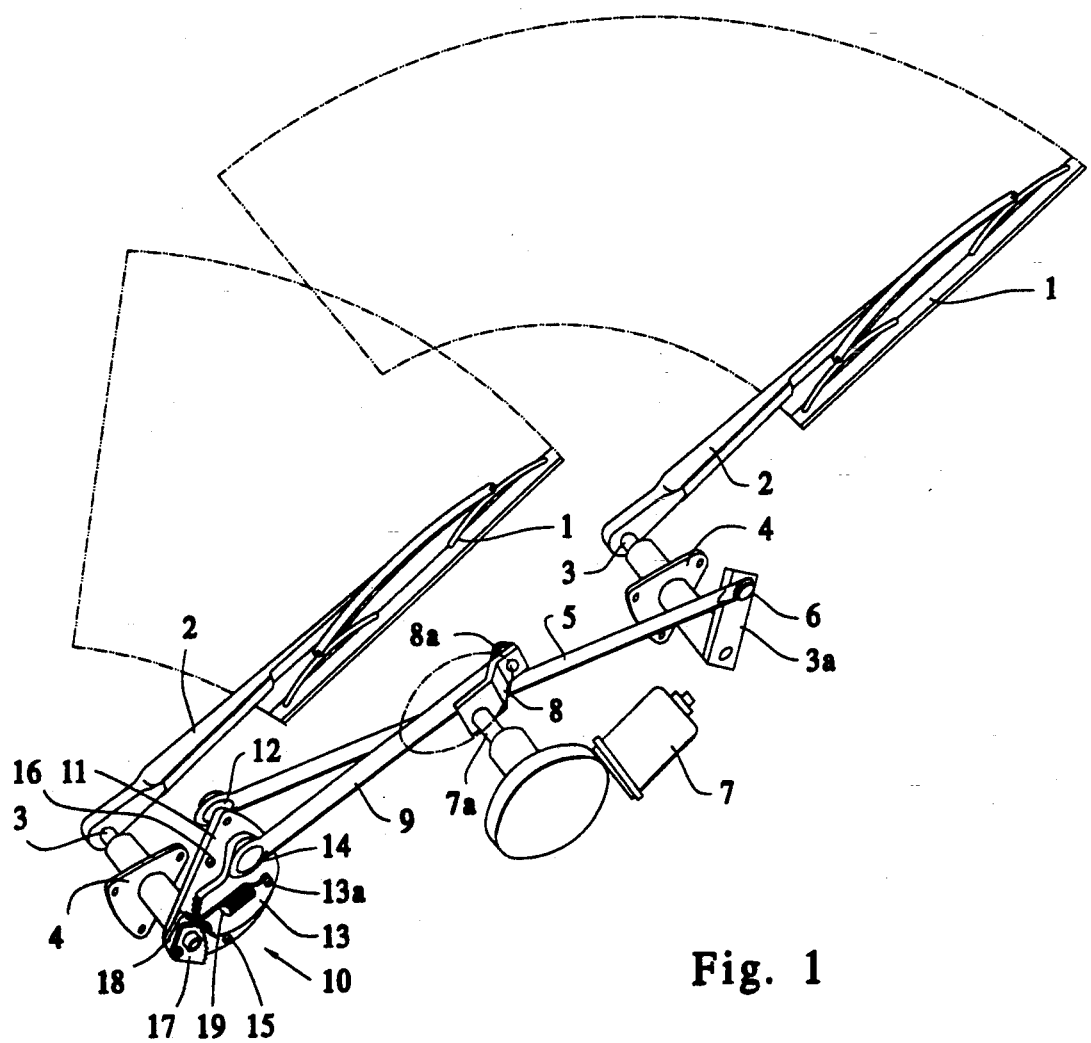
FIG. 1 is a perspective view schematically showing a wiper.

One embodiment of the present invention will now be described with reference to the drawings. Referring to FIG. 1, a wiper has a pair of wiper blades 1, namely a left wiper blade and a right wiper blade. The wiper blades are mounted to wiper arms 2. The respective proximal ends of the wiper arms 2 are fixed to wiper shafts 3 which are supported by pivot holders 4 in such a manner as to be rotatable about the axis of the shafts 3. A pivot lever 3a integrally extends from one of the wiper pivots 3 (from the right shaft 3, in the illustrated embodiment), and the distal end of the layer 3a is joined, through a ball and socket joint 6, to the distal end of a connection link 5 so that this end of the link 5 is turnable.

A wiper motor 7 has an output shaft 7a which is operationally connected with and linked to a crank arm 8. The distal end of the crank arm 8 supports, through a ball and socket joint 8a, the proximal end of a drive link 9 so that this end of the link 9 is turnable. The movement of the drive link 9 which is caused by the driving of the motor 7 is then converted into a reciprocating oscillation of the left and right wiper arms 2 for wiping. The mechanism for converting the motor-caused movement of the drive link 9 consists of a wiping range changing apparatus 10 according to the present invention.

The wiping range changing apparatus 10 includes a first link 11 and a second link 13. The first link 11 is integrally fixed to the rearward end of the left wiper shaft 3. The proximal end of the connection link 5 is turnably joined to the first link 11 through a ball and socket joint 12. The second link 13 is supported on the first link 11 by a fulcrum shaft 13a in such a manner as to be swingable about the shaft 13a relative to the first link 11. The distal end of the drive link 9 is turnably joined to the second link 13 through a ball and socket joint 14. The first link 11 has first and second stoppers 15 and 16 provided thereon which allow the second link 13 to swing relative to the first link 11 within a range determined by a swinging angle $\alpha$. The second link 13 is subjected to the resilient force of a spring 19, described later, in such a manner that the link 13 is set to and held in one of first and second shift positions in which the second link 13 abuts on the first and second stoppers 15 and 16, respectively. The first and second links 11 and 13 swung integrally with each other about the left wiper shaft 3, which serves as a fulcrum shaft, with the second link 13 being set in one of the first and second shift positions.

Figure 4:
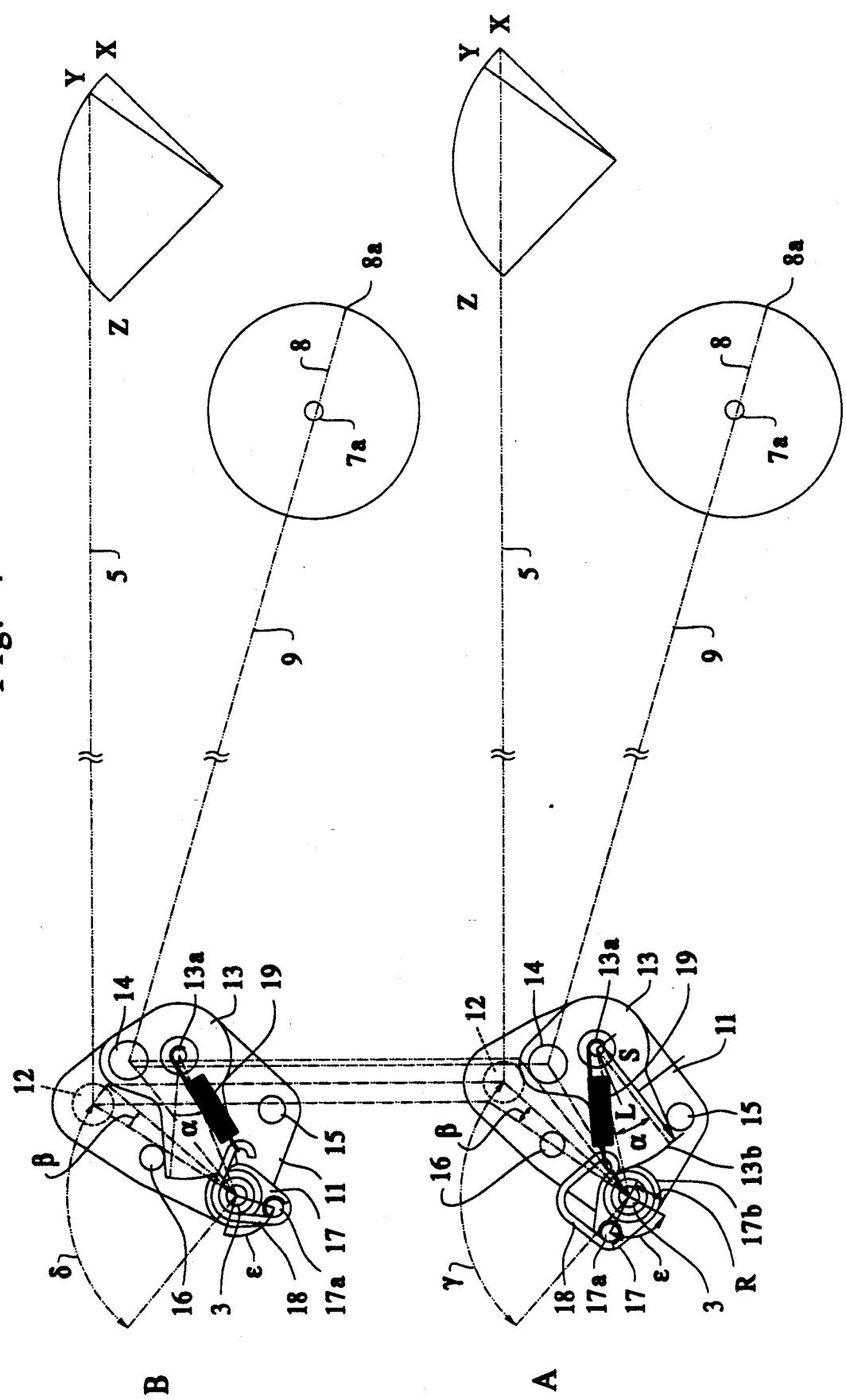
FIGS. 4A and 4B are views showing operation provided in summer mode and winter mode, respectively, the modes having different stop positions.
Figure 5:
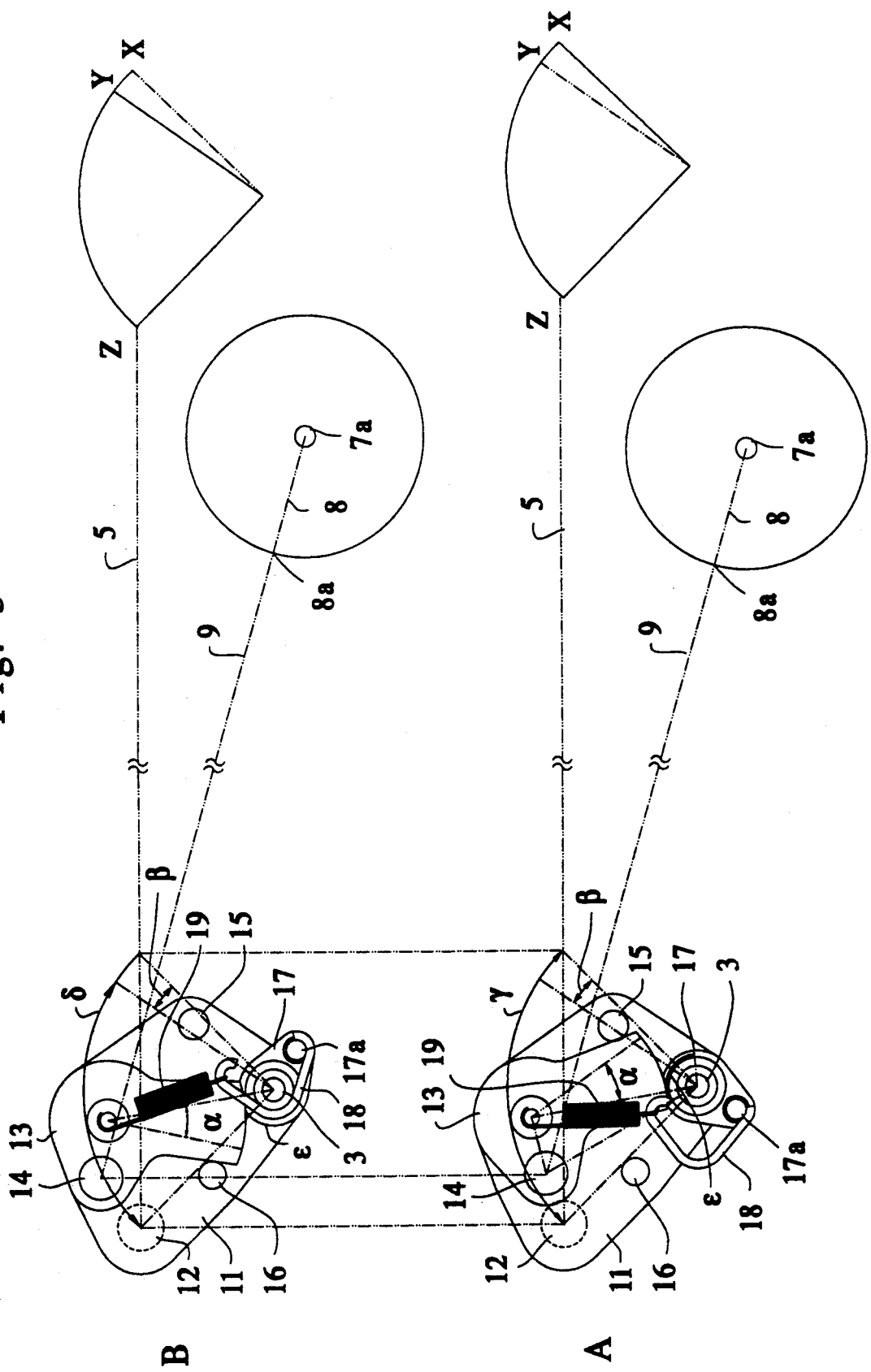
FIGS. 5A and 5B are views showing operation provided in summer mode and winter mode, respectively, the modes having different reversal positions.

When the second link 13 is set in the first shift position (the summer mode position) in which the second link abuts the first stopper 15 (see FIG. 4A), the motor-caused movement of the drive link 9 causes the first and second links 11 and 13 to reciprocatingly swing about the fulcrum shaft, namely, the wiper shaft 3, within the range having an angle $\gamma$. This integral swinging of the links 11 and 13 causes the wiper arms 2 to perform reciprocating oscillation for wiping between a stop position ( which is the auto-stop position) X and the reversal position Z.

On the other hand, when the wiper arm is pulled to the reversal position so as to set the second link 13 to the second shift position (the winter mode position) in which the second link 13 abuts on the second stopper 16 (see FIG. 4B), this setting causes the start position of the first link 11 from which the link 11 swings about the wiper shaft 3 toward its reversal position to be shifted by an angle $\beta$ from the start position obtained in the mode where the second link 13 is set in the first shift position. As a result, the stop position of the wiper arms 2 is varied to a position Y which is the angle $\beta$ advanced from the stop position X obtained in the first shift position mode. Another feature of the mode where the second link 13 is set in the second shift position is that this setting causes an increase in the radius with which the ball and socket joint 14 swings about the wiper shaft 3 (i.e., in the distance between the axis of the joint 14 and that of the wiper shaft 3). As a result, the angle $\delta$ through which the first link 11 is reciprocatingly swung by the motor-caused movement of the drive link 9 is smaller than the swinging angle $\gamma$ obtained in the first shift position mode ($\delta<\gamma$). The above-described features result in that the stop position Y is shifted by the angle $\beta$ toward the reversal position, and simultaneously, this angular shift in the stop position is offset by a substantially equal angular shift at the reversal end of the oscillation range. In consequence, the two possible settings of the second link 13 are such that a setting to either the first or second shift position does not cause a variation in the reverse position Z.

The apparatus 10 also includes an auxiliary link 17 which is, in this embodiment, swingably supported by the wiper shaft 3 serving as the fulcrum shaft of the first link 11. The auxiliary link 17 has, on a peripheral edge thereof which opposes a peripheral edge of the second link 13, a gear 17b which is in meshing engagement with a gear 13b on the opposing edge of the second link 13. The auxiliary link 17 is swingable while following the relative swinging of the second link 13 and being integrated therewith. In this swinging, the radius R with which the auxiliary link 17 swings about the fulcrum shaft 3 is smaller than the radius S with which the link 13 swings about the fulcrum shaft 13a (R<S). Accordingly, when the second link 13 swings through the angle $\alpha$, the auxiliary link 17 swings through a greater angle $\epsilon$ ($\alpha<\epsilon$), thereby amplifying the angle of the relative swinging of the second link 13.

The auxiliary link 17 has an engagement pin 17a projecting therefrom. The engagement pin 17a is positioned on the bisector of the range of meshing engagement of the links 17 and 13, and it is also positioned on that side of the auxiliary link 17 which is not on the side where the gear 17b is formed. The proximal end of an engagement hook 18 engages with the engagement pin 17a. The engagement hook 18 is bent in such a manner as to bypass the wiper shaft 3. A spring 19 is interposed between the distal end of the hook 18 and the fulcrum shaft 13a of the second link 13. The spring 19 is provided in such a manner that, during swinging displacement of the second link 13, the spring 19 has one of its points of support moved across the reference line L connecting the fulcrum shafts 3 and 13a, whereby the spring 19 exerts resilient force under which the second link 13 swings to the appropriate one of the first and second shift positions. The resilient force of the spring allows the second link to be set and held in position in such a manner that the second link 13 can swing integrally with the first link 11. The movement of the point of support of the spring 19 relative to the reference line L (hereinafter referred to as "a point of support traverse") is brought forth by the displacement of the engagement pin 17a when the auxiliary link 17, following the relative swinging of the second link 13, swings through an amplified angle.

In the embodiment having the above-described construction, the driving of the motor 7 causes the wiper arms 2 to perform reciprocating oscillation for wiping between the stop position and the reversal position. In order to change the wiping range at the end including the stop position, the wiper arm 2 is held and forcibly swung so as to set the second link 13 to the desired one of the first and second shift positions, in which the link 13 abuts the first or second stopper 15 or 16. In this process, the second link 13 being swung and displaced relative to the first link 11 is subjected to the resilient force of the spring 19.

Figure 6A:
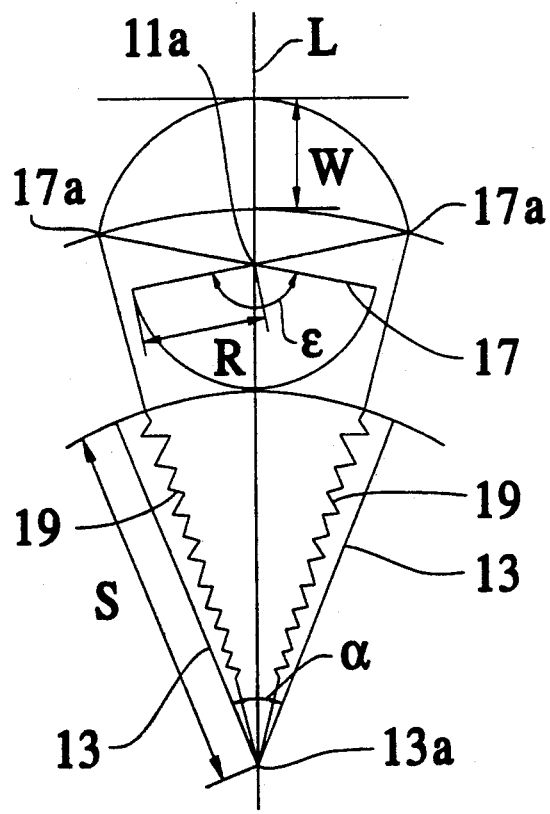
FIGS. 6A and 6B are views showing the interrelation between various parts of the apparatus, which are useful in comparing the wiping range changing state of the apparatus of the present invention (FIG. 6A) and that of a conventional apparatus (FIG. 6B).
Figure 6B:
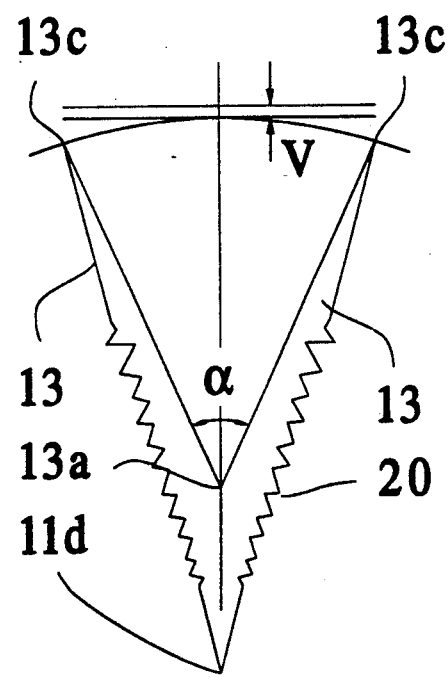

Specifically, when the second link 13 is being swingingly displaced relative to the first link 11, the auxiliary link 17, which is in meshing engagement with the link 13, swings integrally therewith. In this swinging, since the swinging radius of the auxiliary link 17 is smaller than that of the second link 13, the swinging angle $\epsilon$ through which the link 17 swings is greater than the swinging angle $\alpha$ of the link 13. By virtue of this arrangement, the variant W (shown in FIG. 6A) in expansion of the spring 19 between the state in which the second link 13 is set in one of the shift positions and the state in which the engagement pin 17a has reached the reference line L is adequately greater than the expansion variant V (shown in FIG. 6B) obtained by an ordinary arrangement using a spring between two relatively displaceable points of support, that is, a spring 20 which has the same length as the spring 19 and which is interposed between an engagement pin lid on a first link 11 and an engagement pin 13c on a second link 13 (W>V). For this reason, if the resilient force of the spring is the same, the arrangement adopted by the present invention necessitates a greater force of operation to cause a point of support traverse relative to the reference line L than the force of operation necessitated by the ordinary arrangement. This means that it is possible to effectively prevent the oscillation range of the wiper arms 2 from being changed by an easily-effected point of support traverse. If the same force of operation for changing the wiping range is intended, the arrangement adopted by the present invention necessitates a spring having a smaller resilient force, thereby allowing the entire apparatus to be light and compact.

The above-described spring 19 is a tension spring. This is advantageous in that there is no need to use a spring guide which is necessary when a compression spring is used. However, a compression spring may be used in the present invention. In this case, the spring must, of course, be provided on the auxiliary link and at a position thereof which is on the side reverse to that in the above-described embodiment.

In the above-described embodiment, the auxiliary link 17 is swingably supported by the wiper shaft 3 which is also the fulcrum shaft about which the first link 11 swings. The wiper shaft 3 serving as both fulcrum shafts for the links and 17 provides the advantage of simplifying the structure of the apparatus, and reducing the number of required component parts. However, the present invention is not intended to be limited to this structure, and a fulcrum shaft exclusively for the auxiliary link 17 may be provided.

Further, one of the points of support of the spring 19 which is on the second link 13 comprises the fulcrum shaft 13a for the relative swinging of the second link 13. Thus, the shaft 13a is another member having two functions, thereby simplifying the entire structure and reducing the required component parts. However, the present invention is not, of course, limited by this structure.

In the above-described embodiment of the present invention, the first link 11 is connected to the wiper arms while the second link 13 is connected to the motor. However, the present invention may be embodied by employing the opposite construction. What is important is that a swinging of the second link relative to the first link causes a change in the stop position of the wiper arms so that the wiping range is adjusted. Further, in the foregoing embodiment, in order to cause the auxiliary link 17 to swing following the relative swinging of the second link 13, the links are in meshing engagement. However, the present invention is not intended to be limited thereto, and friction between these links 17 and 13 may be utilized.

According to the present invention having the above-described construction, the stop position of the wiper arms is changed by swinging the second link 13 relative to the first link. The means for preventing unwanted shift of the position of the second link comprises a spring interposed between two relatively displaceable points of support. Therefore, there is no need to perform, in order to change the wiping range, a conventional operation of changing the position of the second link by moving the screws which hold it to the first link which is thus troublesome and complicated. According to the present invention, an easy operation of holding and swinging the wiper arm achieves a change in the wiping range.

The spring 19 has one of its ends supported by a link arm of the auxiliary link 17. Since the auxiliary link 17 is swingable following the relative swinging of the second link 13 and with a swinging radius smaller than the swinging radius of the second link 13, the link 17 swings through an amplified angle. This serves to achieve a greater variant in expansion of the spring 19 during a point of support traverse than the expansion variant obtained by an ordinary arrangement. As a result, it is possible to use a spring having a small resilient force if a certain force of operation for changing the wiping range is to be achieved in such a manner that a point of support traverse will not be effected so easily as to result in an unwanted change in the wiping range of the wiper arms. This greatly serves to make the entire apparatus light and compact.

What is claimed is:

1. A link movement conversion mechanism for changing a back and forth wiping range of a window wiper blade mounted on one end of a wiper arm, said wiper arm mounted at an opposite end to a rotatable wiper shaft, said link movement conversion mechanism converting back and forth movement of a drive link driven by a rotating motor into a back and forth sweeping oscillation over the wiping range of the wiper blade, comprising:

a first link integrally fixed to the wiper shaft proximate an end opposite that end to which the wiper arm is mounted;

a second link pivotally mounted to said first link, the drive link driven by the motor pivotally attached to said second link;

an auxiliary link pivotally provided on said first link at a pivot point away from the pivot mount of said second link; a first and a second stop means on said first link for establishing a first and a second link position for said second link which adjust one end of the wiping range; and a tension means for retaining said second link in one of said first and said second link positions, said tension means attached at a first end to said second link and at a second end to said auxiliary link, an edge of said second link and an edge of said auxiliary link being engaged such that rotation of one rotates the other and said tension means retains said second link and said auxiliary link in position when said second link abuts one of said first and second stop means.

2. The link movement conversion mechanism according to claim 1, wherein said spring is a tension spring.

3. The link movement conversion mechanism according to claim 1, wherein said auxiliary link is swingably supported on the wiper shaft adjacent said first link.

4. A link movement conversion mechanism as claimed in claim 1, wherein said tension means comprises an engagement hook and a spring and said auxiliary link has an engagement means at an end away from said second link, said engagement hook having a first end engaged to said engagement means and a second end attached to the first end of said spring, a second end of said spring being attached to said second link.

5. A link movement conversion mechanism as claimed in claim 4, wherein a swinging radius of said auxiliary link is smaller than a swinging radius of said second link.

6. A link movement conversion mechanism as claimed in claim 4, wherein a point of attachment between said second end of said hook and said first end of said spring lies on a first side of a line extending between an axis of said wiper shaft and a center of the pivotal attachment of the drive link to said second link when said second link is in said first link position and the point of attachment lies on a second side of said line when said second link is in said second link position.

7. A link movement conversion mechanism as claimed in claim 1, wherein the engagement of the edges of said second and auxiliary links is one of the types consisting of frictional engagement and interlocking teeth engagement.

8. A link movement conversion mechanism as claimed in claim 1, further comprising a second wiper system and a shaft pivotally mounted at one end of said first link and pivotally mounted at a second end to said second wiper system.

9. A link movement conversion mechanism as claimed in claim 1, wherein the engagement of the edges of said second and auxiliary links comprises an interlocking teeth engagement.

10. A link movement conversion mechanism for changing a back and forth wiping range of a window wiper blade mounted on one end of a wiper arm, said wiper arm mounted at an opposite end to a rotatable wiper shaft, said link movement conversion mechanism converting back and forth movement of a drive link driven by a rotating motor into a back and forth sweeping oscillation over the wiping range of the wiper blade, comprising:
  a first link integrally fixed to the wiper shaft proximate an end opposite to that end to which the wiper arm is mounted;
  a second link pivotally mounted to said first link, the drive link driven by the motor pivotally attached to said second link;
  an auxiliary link pivotally provided on said first link at a pivot point away from the pivotal mount of said second link;
  a first and a second stop means on said first link for establishing a first and a second link position for said second link which adjust one end of the wiping range; and
  a tension means for retaining said second link in one of said first and second link positions, said tension means attached at a first end to said second link and at a second end to said auxiliary link, wherein an edge of said second link and an edge of said auxiliary link are engaged such that rotation of one rotates the other and a swinging radius of said auxiliary link is smaller than a swinging radius of said second link.

11. A link movement conversion mechanism as claimed in claim 10, wherein said tension means comprises an engagement hook and a spring and said auxiliary link has an engagement means at an end away from said second link, said engagement hook having a first end engaged to said engagement means and a second end attached to the first end of said spring, a second end of said spring being attached to said second link.

12. A link movement conversion mechanism as claimed in claim 10, wherein the engagement of the edges of said second and auxiliary links comprises a frictional engagement and interlocking teeth engagement.

13. A link movement conversion mechanism as claimed in claim 10, further comprising a second wiper system and a shaft pivotally mounted at one end of said first link and pivotally mounted at a second end to said second wiper system.

14. A link movement conversion mechanism as claimed in claim 10, wherein a point of attachment between said second end of said hook and said first end of said spring lies on a first side of a line extending between an axis of said wiper shaft and a center of the pivotal attachment of the drive link to said second link when said second link in a first link position and the point of attachment lies on a second side of said line when said second link is in a second link position.

15. A link movement conversion mechanism as claimed in claim 10, wherein the engagement of the edges of said second and auxiliary links comprises an interlocking teeth engagement.

16. A link movement conversion mechanism for changing a back and forth wiping range of a window wiper blade mounted on one end of a wiper arm, said wiper arm mounted at an opposite end to a rotatable wiper shaft, said link movement conversion mechanism converting back and forth movement of a drive link driven by a rotating motor into a back and forth oscillation over the wiping range of the wiper blade, comprising:
  a first link integrally fixed to the wiper shaft proximate an end opposite to that end to which the wiper arm is mounted;
  a second link pivotally mounted to said first link, the drive link driven by the motor pivotally attached to said second link;
  an auxiliary link pivotally provided on said first link at a pivot point away from the pivotal mount of said second link, an edge of said auxiliary link engaging an edge of said second link such that rotation of one rotates the other;
  a first and a second stop means on said first link for establishing a first and a second link position for said second link which define the wiping range; and
  a tension means for retaining said second link in one of said first and said second link positions, said tension means attached at a first end to said second link where said second link is pivotally mounted to said first link and at a second end to said auxiliary link at a point on a side of said auxiliary link opposite to said edge engaging said second link, wherein a swinging radius of said auxiliary link is smaller than a swinging radius of said second link.

* * * * *